United States Patent Office 3,160,576
Patented Dec. 8, 1964

3,160,576
METHOD OF PRODUCING THIN FERROMAGNETIC LAYERS OF UNIAXIAL ANISOTROPY
Oskar Eckert, Lauf (Pegnitz), Germany, assignor, by direct and mesne assignments, to Steatit-Magnesia Aktiengesellschaft, Lauf (Pegnitz), Germany, a corporation of Germany, and Indiana General Corporation, Valparaiso, Ind., a corporation of Indiana
No Drawing. Filed Nov. 8, 1960, Ser. No. 67,878
Claims priority, application Germany Nov. 16, 1959
8 Claims. (Cl. 204—192)

Recently, thin metallic ferromagnetic layers of several hundred to several thousand Angstrom units, A., so-called thin films, have gained considerable scientific interest and technical significance, particularly for use as high-speed-storage elements in the communications field. They consist of ferromagnetic metals or metal alloys, preferably composed so as to have the crystal anisotropy constant K and the magnetostriction constant $\lambda$ approximately zero. The thin metallic layers are applied by vaporizing the respective metals or metal alloys from one or several vaporizing sources (spirals, shuttles or crucibles of high-temperature resistant material, for instance W, Ta, $Al_2O_3$, etc.) in a high vacuum ($<10^{-6}$ torr) onto suitable carrier substances (fine-polished glass, polished ceramic sheets, etc.), which, in some cases may be heated before they are coated. To produce a uniaxial anisotropy, a homogeneous static magnetic field of a definite magnitude is allowed to react in the direction of the supporting surface, or, the uniaxial anisotropy which is an important feature of the magnetic field may be produced in a magnetic field by a separate annealing process. Although the thin layers produced are polycrystalline, they behave like a unitary magnetic domain because of their uniaxial anisotropy. The direction of the spontaneous magnetization is parallel to the direction of the induced uniaxial anisotropy. The magnetic reversal of such a layer takes place starting at a definite magnitude of an outside magnetic field which is effective parallel to the layer through coherent rotation of the magnetization vectors to the second stable position of the magnetization direction, which is counter to the original magnetization direction by 180°. The thus obtained times for magnetic reversals are of the magnitude of some $10^{-9}$ sec. and are smaller by two to three orders of magnitude than in the ordinarily used ferrite ring cores with rectangular hysteresis loops.

This invention describes a method of producing thin ferromagnetic layers consisting of soft magnetic ferrites which possess a uniaxial anisotropy, which is produced either during the making of the layer under the influence of a suitable magnetic field or by subsequent annealing in a magnetic field. For this purpose the invention provides the application of the methods employed in the production of thin metallic layers by high vacuum evaporation, cathodic evaporation or the electrolytic precipitation upon such ferrites which, as to their composition, exhibit uniaxial anisotropy. After annealing in a magnetic field, certain ferrites of the "soft" category show the phenomenon of uniaxial anisotropy, with a crystal-anisotropy-constant K compensated to approximately zero by the addition of a small quantity of Co-ferrite or cobalt ferrite-forming components, and having a magnetostriction constant which, by suitably apportioned addition of $Fe_3O_4$, likewise is brought to values near zero. Without annealing in the magnetic field these ferrites show constricted hysteresis loops, also called Perminvar loops, while under heat treatment in the longitudinal, or transverse magnetic field, they display rectangular, or Isoperm hysteresis loops, respectively. The directional designation of the annealing and the measuring field to each other. According to the invention all those soft magnetic ferrites are suitable for producing thin layers of uniaxial anisotropy which have an $Fe_2O_3$ content of more than 50 mol percent and which have a Co-oxide content of 0.1–5 percent by weight, preferably 0.3–1 percent by weight. The following examples describe the process of the invention.

EXAMPLES 1

PRODUCTION OF A Ni-FERRITE LAYER OF UNIAXIAL ANISOTROPY

A. By Oxidation of Metallic Layers ($a_1$) The raw material consists of a Ni–Fe–Co alloy of the following range of composition:

$$Ni_{1-x-y}Co_xFe_{2+y}$$

where $$0.001 < x < 0.05$$
$$0.05 < y < 0.15$$

This is deposited by evaporation from a suitable evaporating crucible, for instance, $Al_2O_3$ or MgO, in a high vacuum ($p < 10^{-6}$ torr) upon a suitable substrate, which may be heated, for instance, fire-polished glass, polished $Al_2O_3$ or the like, to a layer thickness of several hundred or several thousand A. units. The layer thus produced is polycrystalline and is further treated, in accordance with the invention, as follows:

It is carefully oxidized at a temperature range between 600° and 1000° C. by suitable dosage of the oxygen content of a nitrogen-oxygen mixture until the Rontgen- or electron diffraction clearly discloses the spinel lattice of the ferrites. At this stage of the oxidation the oxygen feed is cut off, and during the cooling of the ferrite layer from some ten degrees above the Curie temperature down to room temperature, a static magnetic field effective in the layer plane for the production of the desired uniaxial anisotropy is applied.

The primary metal layer may also be produced, without restricting the scope of the invention, by high vacuum evaporation of the alloy components from separately located evaporation sources.

This modification of the process has the advantage that in case of different evaporation temperatures of the individual alloy components, the heat may be individually adapted and the concentration adjusted, for example, by rotating sector shutters in front of the evaporation sources.

($a_2$) The primary metal layer may further be produced by cathodic sputtering and deposition in vacuum by means of oxidation-inhibiting sputtering gases, for instance, rare gases, $N_2$ or also $H_2$, at a pressure of $10^{-1}$ to $10^{-2}$ torr, wherein the cathode employed is a metal alloy of the above-indicated composition range, or separate cathode blocks, consisting of the individual alloy components may be employed. The latter will always be advantageous when the sputtering conditions for the individual alloy components differ widely and require differentiated sputtering potentials. Further, in this manner the concentration of the metal layer applied through the rotating sector shutters may be more readily controlled.

($a_3$) In another version, the primary metal layer can be produced by the electrolytic methods ordinarily employed for electroplating, such as described, for instance, by I. W. Wolf and V. P. McConnell, Proc. Am. Electroplaters Soc. 1–4, 1956, and I. W. Wolf, H. W. Katz, A. E. Brain, Proc. 1959, Electronic Component Conf., pages 15–20.

B. By Direct Layer Formation ($b_1$) By cathodic sputtering and deposition.—Again the raw material is a Ni–Fe–Co alloy of the composition described under ($a_1$). However, the sputtering gas is now oxygen of $10^{-1}$ to $10^{-2}$ torr, which completely oxidizes the disposed metal atoms of the alloy on the way to the substrate, resulting in the formation of a ferrite layer. Suitably, in this process the substrate is heated to temperatures of about 800° C. again, to produce the uniaxial anisotropy, during the cooling process down to room temperature, a magnetic field parallel to the layer plane of at least twice the coercive force of the ferrite is applied. To prevent further oxidation, the vacuum bell jar is rinsed with a neutral gas or pumped to a high vacuum of $<10^{-6}$.

($b_2$) *By ferrite evaporation in high vacuum without crucible.*—The raw material consists of a Perminvar ferrite of the composition $(Ni_{1-x-y}Co_xFe_y)O.Fe_2O_3$. This ferrite is produced in form of cylinders about the thickness of a pencil by extrusion of the raw ferrite body prepared according to ceramic methods and subsequent sintering. Two such ferrite cylinders which are pointed are brought into point contact and connected to a high voltage source. These cylinders are now heated from an outside source, whereupon the resistance thereof because of their negative resistance temperature coefficient, is quickly reduced and a current begins to flow through the cylinders, which in turn heats up the pointed ends of the ferrite cylinders to the melting and evaporation temperature. As in the case of the carbon arc evaporation, ferrite particles are thus thrown on a substrate about 20 cm. distant, and the substrate is coated with the desired ferrite layer. The uniaxial anisotropy may be produced, in accordance with the invention, either immediately following the layer formation process by cooling in a magnetic field effective parallel to the layer plane from a temperature slightly above the Curie temperature down to room temperature in the high vacuum, or by a separate annealing process by heating to a temperature of some ten degrees above the Curie point and subsequent cooling in the magnetic field.

($b_3$) *By ferrite evaporation from a crucible in high vacuum.*—The raw material consists of a Perminvar-ferrite powder made according to ceramic processes of the composition $(Ni_{1-x-y}Co_xFe_y)O.Fe_2O_3$. This powder is placed in a crucible of $Al_2O_3$, MgO, etc., in a high vacuum evaporation apparatus of conventional design and at pressures of $<10^{-6}$ torr heated by electric current and finally evaporated.

The temperatures required in this instance are between 1400° and 1600° C. The further treatment of the layer precipitated upon the carrier takes place in the manner heretofore described under ($b_2$).

To obtain a layer which is homogeneous as to the proportion of its constituents, the carrier or crucible is suitably covered by a shutter until the complete melting of the contents thereof and only then is released for vaporization.

EXAMPLES 2

Further examples with respect to an alternate choice of ferrite components, see col. 1 of the following table.

The layers produced according to one of the examples under (1) of the composition $(Ni_{1-x-y}Co_xFe_y)O.Fe_2O_3$ are polycrystalline, show the spinel structure of the ferrites and are ferromagnetic, with the following properties:

Saturation magnetization _____gauss__ 3400–3800
Curie temperature _____° C__ 540–580
Coercive force _____oe__ 25–8

The hysteresis loop, is, (a) (measured parallel to the uniaxial anisotropy): an isoperm loop.

$$\frac{B_r}{B_s} > 0.85$$

(b) (measured perpendicularly to the direction of the uniaxial anisotropy): an isoperm loop.

The magnetic reversal by coherent rotation required some $10^{-9}$ sec.

As heretofore described in the introduction, it is possible, in principle, to produce soft magnetic ferrite layers according to the methods of the invention with the characteristic of uniaxial anisotropy, insofar as their composition includes a suitable $Fe^{2+}$ and $Co^{2+}$ content and accordingly have the following formula $$(Me^{2+}_{1-x-y}Co^{2+}_xFe^{2+}_y)O.Fe_2O_3$$

with the limits $$0.001 < x < 0.05$$
$$0.05 < y < 0.15$$

The designation $Me^{2+}$ is used to indicate the following bivalent metal ions, which may be present singly or in combination with each other, always, however, in such a manner that their total mol content does not go above $(1-x-y)$:

$Ni^{2+}$, $Mn^{2+}$, $Mg^{2+}$, $Cu^{2+}$, $Zn^{2+}$, $Cd^{2+}$

Cases in which a (Zn–Co–Fe) ferrite, or a (Cd–Co–Fe) ferrite, or also a (Zn–Cd–Co–Fe) ferrite would be obtained must be excluded.

The following table summarizes the processes which may be successfully applied in accordance with the invention for thin ferromagnetic layers with uniaxial anisotropy of various Perminvar ferrite systems and some of the properties of such layers.

| $Me^{2+}$ | Production of primary metal layers ||||| Direct layer production, cathodic dispersion || HV-evaporation ||| Properties ||||
|---|---|---|---|---|---|---|---|---|---|---|---|---|---|
| | HV-evaporation || Cathodic dispersion || Electrolysis | | | Crucible-free evaporation | Crucible evaporation | Saturation magnet, $B_s$ | Coercive force parallel to U.A. axis, A/cm. | $B_r/B_s$ | $T_c$, degrees |
| | Jointly | Separately | Jointly | Separately | | Jointly | Separately | | | | | | |
| $Ni^{2+}$ | + | (a) | + | (a) | + | + | (a) | + | + | 3400–3800 | 2.5–8 | 0.85 | 540–580 |
| $Mn^{2+}$ | − | + | − | + | − | − | + | + | + | 3800–4200 | 1.5–6 | 0.80 | 330–380 |
| $Mg^{2+}$ | − | + | − | + | − | − | + | + | + | 2500–3300 | 3.2–10 | 0.85 | 280–350 |
| $Ni^{2+}$ $Zn^{2+}$ | − | + | − | + | + | + | + | + | +b | 3000–4500 | 0.3–2.5 | 0.85 | 100–540 |
| $Mn^{2+}$ $Zn^{2+}$ | − | + | − | + | + | + | + | + | + | 3500–4600 | 0.2–3 | 0.80 | 100–350 |
| $Cu^{2+}$ | − | + | − | + | − | − | + | + | +c | 1200–1600 | 0.5–3.0 | 0.80 | 330 |
| $Mg^{2+}$ $Zn^{2+}$ | − | + | − | + | − | − | + | + | + | 2500–3800 | 0.2–4.5 | 0.85 | 160–330 |
| $Ni^{2+}$ $Mn^{2+}$ * | + | (II) | + | − | + | + | − | + | + | 3500–4200 | 0.6–6.0 | 0.80 | 330–540 |
| $Ni^{2+}$ $Cd^{2+}$ | − | + | − | − | − | − | − | + | + | 1600–3800 | 0.8–8.0 | 0.85 | 280–350 |
| $Mn^{2+}$ $Mg^{2+}$ | − | + | − | − | − | − | − | | | | | | |

*Where $Ni^{2+}$ content high, otherwise separately.
(II) Not necessary if Ni-content high.
a Not necessary.
b Poly-crystalline.
c Spinel structure.

The layers produced as described in the invention have the advantage over ferromagnetic layers heretofore known and used in that they are stable with respect to oxidation and need not be protected by coats of SiO as was thus far necessary. Due to their high electric resistance the electrical conductors required for magnetization may be directly applied to these layers according to known methods of printed circuits, etc.

I claim:

1. The method of producing thin ferromagnetic layers with uniaxial anisotropy comprising
   providing a base plate
   applying a layer of a thickness of several hundred to several thousand Angstrom units of a ferromagnetic ferrite material of the formula $$(Me^{++}_{1-x-y}Co^{++}_x Fe^{++}_y)O \cdot Fe_2O_3$$

wherein $0.001 < x < 0.05$ and $0.05 < y < 0.15$, to said base plate, $Me^{++}$ being a bivalent metal ion selected from the group consisting of $Ni^{++}$, $Mn^{++}$, $Mg^{++}$, $Cu^{++}$, mixtures thereof with each other, and mixtures thereof with $Zn^{++}$ and with $Cd^{++}$.
   and thermally treating the applied ferrite from a temperature of about 10° C. above the Curie temperature thereof down to about room temperature in a static magnetic field to produce a state of uniaxial anisotropy thereof.

2. The process as claimed in claim 1 wherein said ferromagnetic material is applied to said plate by first depositing thereon, the metallic components, Me, Co and Fe in the proportions required in said ferrite and then treating the metals to oxidize the same to said ferrite.

3. The process as claimed in claim 2 comprising applying the metallic components to the base plate by cathodically sputtering the separate metals onto said base plate.

4. The process as claimed in claim 2 comprising providing an alloy of the metal components in the proportions desired in said ferrite and cathodically sputtering the alloy onto said base plate.

5. The process as claimed in claim 1 comprising providing the metallic components of said ferrite and cathodically sputtering the metallic components onto said base plate in the presence of oxygen.

6. The process as claimed in claim 5 wherein said metallic components are provided in the form of an alloy with the metal components thereof in the proportion required in said ferrite.

7. The process as claimed in claim 1 comprising providing a preformed ferrite of said composition, evaporating said ferrite under the influence of a high vacuum and redepositing the ferrite directly onto said base plate.

8. As a new article of manufacture a basis plate of refractory material, at least one portion thereof being coated with a layer of several hundred to several thousand Angstrom units thick of a ferrite of the formula $$(Me^{++}_{1-x-y}Co^{++}_x Fe^{++}_y)O \cdot Fe_2O_3$$

where $Me^{++}$ is selected from the group consisting of $Ni^{++}$, $Mn^{++}$, $Mg^{++}$, $Cu^{++}$, mixtures thereof with each other, and mixtures thereof with $Zn^{++}$ and with $Cd^{++}$, and wherein $0.001 < x < 0.05$ and $0.05 < y < 0.15$.

References Cited in the file of this patent

UNITED STATES PATENTS

| | | |
|---|---|---|
| 2,906,682 | Fahnoe et al. | Sept. 29, 1959 |
| 2,960,457 | Kuhlman | Nov. 15, 1960 |
| 2,970,112 | Pierrot et al. | Jan. 31, 1961 |
| 3,100,194 | Van der Burgt | Aug. 6, 1963 |

OTHER REFERENCES

Blois: "Preparation of Thin Magnetic Films and Their Properties," Journal of Applied Physics, vol. 26, No. 8, August 1955, pp. 975–980.

Williams et al.: "Magnetic Domain Patterns on Thin Films," Journal of Applied Physics, vol. 28, No. 5, May 1957, pp. 548–555.